United States Patent [19]
Diesen et al.

[11] 3,984,311
[45] Oct. 5, 1976

[54] WET COMBUSTION OF ORGANICS
[75] Inventors: Ronald W. Diesen; John R. Moyer, both of Midland, Mich.
[73] Assignee: The Dow Chemical Company, Midland, Mich.
[22] Filed: Oct. 5, 1972
[21] Appl. No.: 295,373

[52] U.S. Cl. ................................. 210/63 R; 210/71
[51] Int. Cl.² .......................................... C02C 5/04
[58] Field of Search .................. 210/10, 50, 62, 63, 210/71; 423/245, 437, 502; 252/438

[56] References Cited
UNITED STATES PATENTS

| | | | |
|---|---|---|---|
| 2,690,425 | 9/1954 | Moses et al. | 423/437 X |
| 3,179,498 | 4/1965 | Harding et al. | 423/502 |
| 3,232,869 | 2/1966 | Gard | 210/63 X |
| 3,271,447 | 9/1966 | Naylor, Jr. | 252/438 X |
| 3,316,173 | 4/1967 | Mills et al. | 210/63 X |
| 3,504,043 | 3/1970 | Kominami et al. | 252/438 X |
| 3,649,534 | 3/1972 | Schotte | 210/63 |

OTHER PUBLICATIONS

"The Development of a Wet Oxidation Process for Municipal Refuse," Boegly, Jr., et al., R.No. ORN-L-HUD-15, Feb. 1971.

*Primary Examiner*—Charles N. Hart
*Assistant Examiner*—Robert H. Spitzer
*Attorney, Agent, or Firm*—Stephen R. Wright; Bruce M. Kanuch

[57] ABSTRACT

An anionic co-catalyst system is provided for the oxidation of organic compounds in aqueous solutions. After the solution is acidified, a nitrate ion source and at least one of either a bromide or an iodide ion source are introduced into the solution which is heated in the presence of an oxidizing agent.

13 Claims, No Drawings

WET COMBUSTION OF ORGANICS

BACKGROUND OF THE INVENTION

The present invention relates broadly to the destruction of organic compounds in aqueous solutions. More specifically the invention relates to destruction of organics in an aqueous solution by oxidation in the presence of a catalyst system.

Disposal of aqueous wastes containing relatively high concentrations of organic compounds presents a difficult pollution problem. One approach to the solution of this problem is to decompose the organic components by biological degradation. This involves providing micro-organisms capable of decomposing the organic and large ponds or particulate piles to give the micro-organisms access to oxygen and a surface on which to operate.

However, there are serious drawbacks to the use of such biological processes. First, the micro-organisms generally digest only organics of relatively low concentration, so that most aqueous waste streams must be diluted before exposure to the micro-organisms. Second, many organic components are non-biodegradable or even toxic to the micro-organisms. Obtaining an appropriate micro-organism for use on a given aqueous waste stream may be very difficult. Finally, many of the waste streams contain brines, which not only inhibit biological processes, but also require further treatment to remove dissolved or suspended solids before discharge into public waters.

Another approach is to utilize "wet combustion" reactions which involve treating the aqueous waste with air under conditions of high pressure and temperature. Containers constructed of special materials are required to withstand the high temperatures and pressures developed. Furthermore, since the fuel value of many aqueous wastes is low, heat recovery through heat exchangers constructed of special materials is advisable to obviate the need for large external additions of heat.

Consequently, there is need for a catalytic system which permits wet combustion reactions to take place at substantially lower operating temperatures and pressures. This would ease the demands on materials of construction and extend the utility of wet combustion to include streams containing lower concentrations of organics since less inherent fuel value or external additions of heat would be required to sustain the reaction. Desirably the catalyst system should be operable in brine systems and should not itself contaminate the purified waste stream.

SUMMARY OF THE INVENTION

The present invention is an anionic cocatalyst system which permits the oxidation of substantially all organic and many inorganic compounds in an aqueous solution which may contain brines by use of an oxidizing agent, such as air, at moderate temperature and pressure. An aqueous solution of the compounds to be oxidized is acidified to a pH of less than about 4 and to the acidified solution in combination are added a nitrate ion source and at least one of either a bromide or an iodide ion source. Addition of a small stoichiometric excess of oxygen relative to that required to oxidize all of the organic to $CO_2$ and $H_2O$ and heating to the vicinity of about 150°–300° C. for an appropriate time period effect the oxidation.

DETAILED DESCRIPTION OF INVENTION

Figure 1:
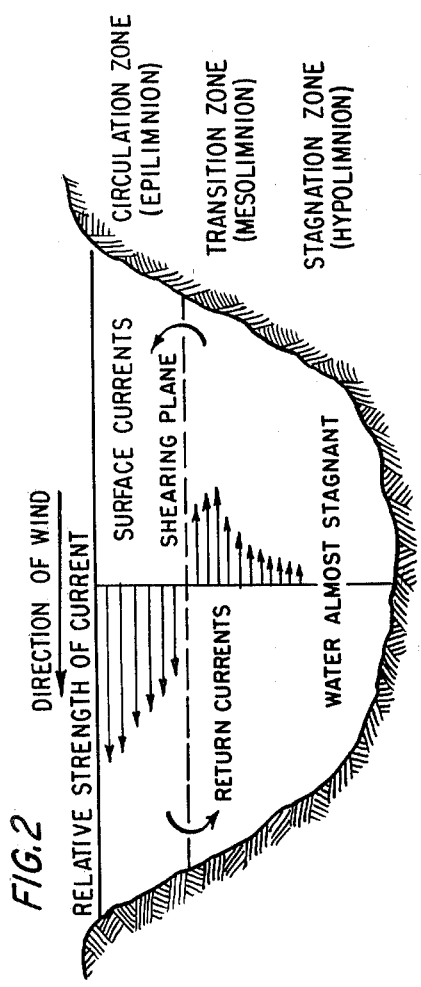

The method of the present invention may be practiced in either a batch or a continuous process.

Acidification of the solution to be oxidized is carried out by supplying hydronium ion. Any acid capable of acidifying the solution to the desired pH without being decomposed by the oxidizing agent is suitable. Concentrated mineral acids are preferred. Organic acids are not favored since they are decomposed by the oxidizing agent. Use of concentrated nitric acid both reduces the pH and supplies nitrate ion and is thus particularly useful.

One of the factors influencing reaction rate is acidity. Although catalytic effect appears to be first noticeable at pH of about 4, at pH 1 the reaction rate for the catalyzed system and certain organics is approximately 100,000 times the reaction rate of the non-catalyzed system. Thus operation at pH near 1 is preferred. Operation at lower pH than 1 further increases reaction rate but attainment of such acidity may require objectionably great quantities of acid.

The nitrate ion may be supplied by virtually any substance which contains nitrate ion or forms nitrate ion in the reaction zone of the process. Inorganic nitrate and nitrite salts and forms of nitrogen oxide such as NO and $NO_2$ are useful sources of nitrate ion. The reaction rate is found to be substantially independent of the concentration of nitrate ion, but a certain threshold concentration must be maintained to allow the oxidation to proceed. The presence of nitrate ions in an amount of at least 50 ppm in the reaction mixture is satisfactory for the oxidation of most organics.

Either or both bromide or iodide ion are added as the co-catalyst source. Almost any substance containing Br or I or forming $Br^-$ or $I^-$ in the reaction zone is usable. $Br_2$ or $I_2$ are preferred, economical sources; the inorganic and organic bromides and iodides are also useful. The reaction rate depends on the concentration of bromide or iodide ion present. Although a concentration of about 0.005 molar in the reaction mixture was adequate for the destruction of glycolic acid, different organics might require greater additions of $Br^-$ or $I^-$. Thus in any particular system the optimum reactant quantity can be determined prior to large scale operations.

Although conventional oxidizing agents such as hydrogen peroxide, ozone, or persulfate ion are usable in this invention, a desirable feature is that ordinary air is satisfactory as the oxidizing agent. The air and/or other oxidizing agent should be supplied in a quantity sufficient to furnish a small stoichiometric excess of oxygen over the amount of organic to be oxidized.

The reaction zone is maintained at an elevated temperature. Temperature is a factor influencing reaction rate. Although oxidation can be noticed in the present system at about 100°C., a temperature of 200° C. permits a much greater reaction rate. Some organic substances can be oxidized at sufficient rates at lower temperatures, such as 150° C. Temperatures above about 300° C. allow oxidation to some degree even in a noncatalyzed system. Pressures on the order of 5000 psig can be developed at such temperatures, thus requiring specialized high pressure reactions systems and equipment. Therefore a temperature range of about 200° C. to about 300° C. is preferred.

The required residence time of the reactants within the reaction zone depends on temperature, pressure, and the nature of the organic material to be reacted. For example, a 204° C. glycolic acid was 90% oxidized within 13 minutes whereas at 230° C. 135 minutes was required to achieve 90% removal of acetic acid. The overall reaction rate increases with temperature, bromide or iodide ion concentration, acidity, and depends on the species of compound to be oxidized.

It is believed that any organic and many inorganics may be oxidized according to the practice of this invention. For example, carboxylic acids such as glycolic, acetic, and formic acids, alcohols, aldehydes, ketones, aromatics, and water soluble organophosphorous compounds, mercaptans, organo heterocyclics, and sulfides can be oxidized. The method of the present invention is particularly useful for destroying those organics which are not physically separable from the mixtures in which they are encountered. The reaction products of the oxidation of the organic component are $CO_2$, $H_2O$, a trace of nirogen or a nitrogen oxide, and bromine or iodine. The catalyst materials may be removed, for example by scrubbing, from the oxidation product stream and recycled for use as starting reactants.

The process is fully usable in brines concentrated even up to the point of saturation.

EXAMPLES

In each of the examples set forth in Table I, one liter of water was placed in a 2 liter titanium pressure reactor. To this were added various combinations of hydrochloric acid, catalyst, salt (to simulate presence of brine), and an organic material. The vessel was pressurized to 80 p.s.i.g. with oxygen and then heated to a specific temperature. Liquid samples of the reaction mixture were periodically removed from the reaction vessel. The disappearance of glycolic or acetic acid from these samples was determined by NMR analysis and confirmed by Total Organic Carbon (TOC) analysis. From these data the figures set forth in the last two columns of Table I were determined.

Example 1 shows that the use of the co-catalyst system permits rapid oxidation of glycolic acid at 204° C. Use of either constituent individually, however, does not permit noticeable oxidation of glycolic acid at 204° C., as seen in Comparative Examples A and B. In Comparative Examples A and B no removal of organic was noted at the end of two hours, but experimental error was estimated to be about ±5% so that the amount of organic removal is stated to be <5%.

That the reaction rate varies with bromide ion concentration is seen by comparing Example 2 with Example 1. That the reaction rate does not vary with nitrate ion concentration above a threshold concentration is seen by comparing Example 3 with Example 2.

Comparison of Example 4 with Example 1 shows that the reaction rate varies with temperature. When Examples 5 and 6 are examined with Comparative Example C, it is seen that the reaction rate varies with hydronium ion concentration. It is noted that acetic acid is oxidized at a slower rate than glycolic acid even under duress of higher temperature, of Examples 1 and 7.

That iodide may be substituted for bromide as a co-catalyst with nitrate is seen by comparing Examples 3 and 8. Comparison of Examples 6 and 7 demonstrates that operation of the catalyst system is not inhibited by the presence of a brine.

What is claimed is:

1. A method for the oxidation of organic compounds in an aqueous solution of pH not more than about 4 to reduce the total organic carbon content of said solution comprising oxidizing the organic compound by contacting said compound with an oxidizing agent in said aqueous solution in the presence of a catalytic amount of a co-catalyst system comprising nitrate ions and at least one of either bromide ions or iodide ions at a sufficient temperature to effect oxidation.

2. The method of claim 1 wherein the pH of the aqueous solution is not more than about 1.

3. The method of claim 1 wherein the concentration of the bromide and/or iodide ion is at least about 0.005 moles per liter of said solution.

4. The method of claim 1 wherein the concentration of the nitrate ion is at least about 50 parts per million by weight of said solution.

5. The method of claim 1 wherein the reaction vessel is heated to a temperature of at least about 100° C.

6. The method of claim 1 wherein the reaction vessel is heated to a temperature of from about 150° C. to about 300° C.

7. A method for the oxidation of organic compounds in aqueous solution to reduce the total organic carbon content of said solution comprising
   a. acidifying an aqueous solution containing an organic compound to be oxidized to a pH of not more than about 4;
   b. adding to the solution a catalytic quantity of a nitrate ion source and at least one of either a bromide or an iodide ion source;
   c. supplying an oxidizing agent which is capable of oxidizing said organic to said solution, and
   d. heating the solution to a temperature of at least about 100° C.

TABLE I

WET COMBUSTION OF ORGANICS

| Example No. | Glycolic Acid (g) | Acetic Acid (g) | NaCl (g) | NaBr (g) | NaI (g) | $NaNO_3$ (g) | pH | Temp. (°C.) | Amount Organic Removed At End of 120 Min. (Weight %) | Time Required To Remove 90 Weight % Organic (Min.) |
|---|---|---|---|---|---|---|---|---|---|---|
| 1 | 1.4 | — | 53.5 | 5.0 | — | 1.0 | 1.0 | 204 | >99 | 13 |
| Comparative A | 1.4 | — | 53.5 | — | — | 1.0 | 1.0 | 204 | <5 | Very Slow |
| Comparative B | 1.4 | — | 53.5 | 5.0 | — | — | 1.0 | 204 | <5 | Very Slow |
| 2 | 1.4 | — | 53.5 | 0.6 | — | 1.0 | 1.0 | 204 | 98 | 75 |
| 3 | 1.4 | — | 53.5 | 0.6 | — | 0.5 | 1.0 | 204 | 98 | 75 |
| 4 | 1.4 | — | 53.5 | 5.0 | — | 1.0 | 1.0 | 175 | 70 | 230 |
| Comparative C | — | 2.5 | 53.5 | 5.0 | — | 1.0 | 2.7 | 230 | 12 | 2140 |
| 5 | — | 2.5 | 53.5 | 5.0 | — | 1.0 | 1.4 | 230 | 40 | 540 |
| 6 | — | 2.5 | 53.5 | 5.0 | — | 1.0 | 1.0 | 230 | 87 | 135 |
| 7 | — | 2.5 | — | 5.0 | — | 1.0 | 1.0 | 230 | 87 | 135 |
| 8 | 1.4 | — | 53.5 | — | 0.6 | 0.43 | 1.0 | 200 | 97 | 80 |

8. The method of claim 7 wherein the solution is acidified with nitric acid.

9. The method of claim 7 wherein the solution is acidified to a pH of not more than about 1.

10. The method of claim 7 wherein the concentration of the bromide and/or iodide ion is at least about 0.005 moles per liter of said solution.

11. The method of claim 7 wherein the concentration of the nitrate ion is at least about 50 parts per million by weight of said solution.

12. The method of claim 7 wherein the oxidizing agent is air.

13. The method of claim 7 wherein the reaction vessel is heated to a temperature of from about 150° C. to about 300° C.

* * * * *

UNITED STATES PATENT OFFICE
CERTIFICATE OF CORRECTION

PATENT NO. : 3,984,311
DATED : October 5, 1976
INVENTOR(S) : Ronald W. Diesen; John R. Moyer It is certified that error appears in the above–identified patent and that said Letters Patent are hereby corrected as shown below:

Column 1, line 51, delete "systems" and insert --streams--.

Column 3, line 2, delete "a" and insert --at--.

Column 3, line 19, delete "nirogen" and insert --nitrogen--.

Column 4, line 9, delete "of" second occurrence, and insert --cf--.

Figure 3:
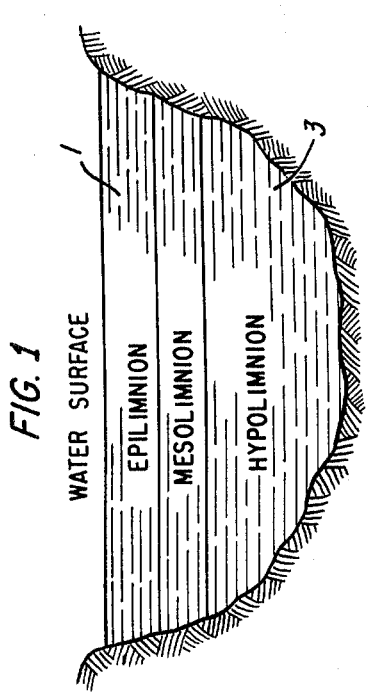
Figure 2:
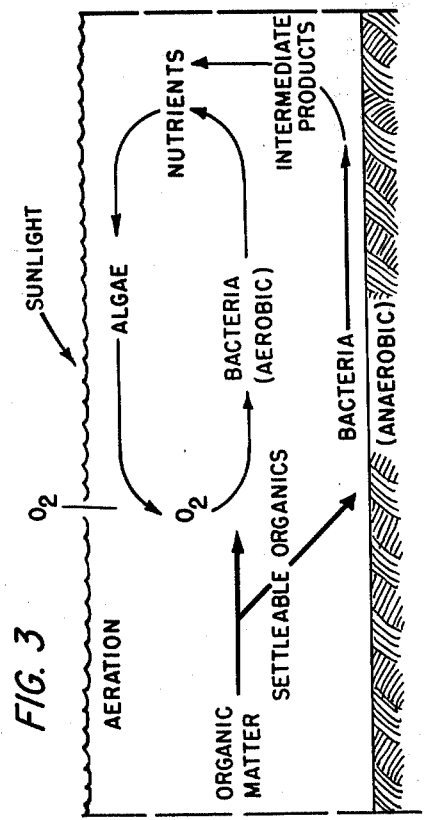
Figure 4:
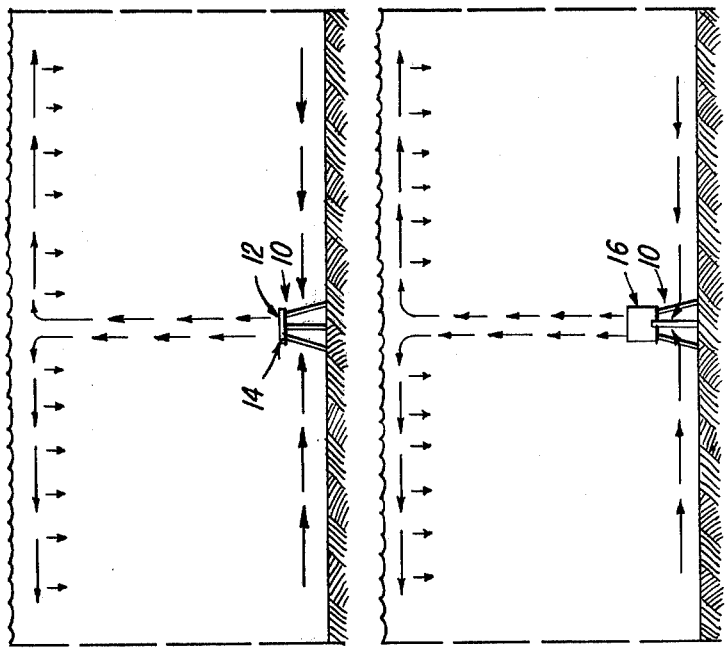
Figure 5:
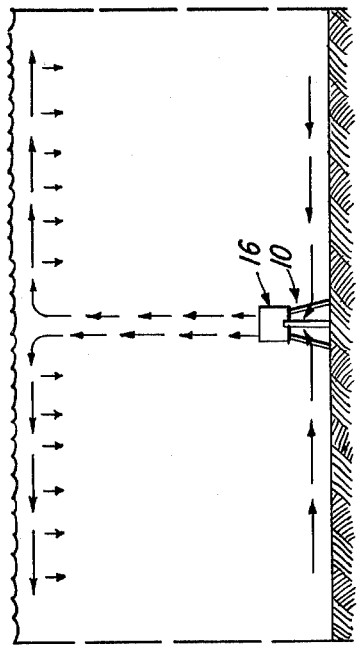

Delete sheet of drawing, Fig. 1 through 5.

Signed and Sealed this

Fourteenth Day of December 1976

[SEAL]

Attest:

RUTH C. MASON
Attesting Officer

C. MARSHALL DANN
Commissioner of Patents and Trademarks